(12) United States Patent  (10) Patent No.: US 8,371,245 B2
Papadoyianis et al.  (45) Date of Patent: Feb. 12, 2013

(54) AQUACULTURE PRODUCTION SYSTEM

(76) Inventors: Ernest D. Papadoyianis, Boca Raton, FL (US); Xavier T. Cherch, Boca Raton, FL (US)

( * ) Notice: Subject to any disclaimer, the term of this patent is extended or adjusted under 35 U.S.C. 154(b) by 439 days.

(21) Appl. No.: 12/798,066

(22) Filed: Mar. 29, 2010

(65) Prior Publication Data

US 2010/0224136 A1  Sep. 9, 2010

Related U.S. Application Data

(63) Continuation-in-part of application No. 11/307,013, filed on Jan. 19, 2006, now abandoned.

(60) Provisional application No. 60/650,296, filed on Jan. 26, 2005.

(51) Int. Cl.
*A01K 63/00* (2006.01)

(52) U.S. Cl. ........................................................ 119/223

(58) Field of Classification Search .................. 119/200, 119/204, 207, 208, 209, 215, 223, 224, 234, 119/238, 239, 240; 43/54.1, 55, 56; 220/4.08, 220/4.17, 4.16, 4.28, 4.33, 681, 693, 614, 220/622

See application file for complete search history.

(56) References Cited

U.S. PATENT DOCUMENTS

| | | | | |
|---|---|---|---|---|
| 817,314 A * | 4/1906 | Hahn | ........................... | 220/4.16 |
| 1,073,871 A * | 9/1913 | Sillman | ........................ | 220/4.17 |
| 1,451,967 A * | 4/1923 | Starclough | .................... | 220/4.16 |
| 2,661,116 A * | 12/1953 | Bombarger | ........................ | 220/6 |
| 2,739,410 A * | 3/1956 | Budnick | ........................... | 43/55 |
| 2,749,956 A * | 6/1956 | Eldred | ............................ | 220/9.3 |
| 2,797,524 A * | 7/1957 | Nelson | ............................... | 43/55 |
| 2,837,860 A * | 6/1958 | Norling | ............................... | 43/56 |
| 2,924,350 A * | 2/1960 | Greer | ........................... | 220/567.2 |
| 3,193,847 A * | 7/1965 | Mashura | ........................ | 52/169.1 |
| 3,640,073 A * | 2/1972 | Samsel | ............................. | 405/70 |
| 3,653,215 A * | 4/1972 | Crucet | ............................ | 405/60 |
| 4,033,137 A * | 7/1977 | Geist | ............................. | 405/71 |
| 4,036,390 A * | 7/1977 | Morse | ........................... | 220/562 |
| 4,084,543 A * | 4/1978 | Pequegnat | ..................... | 119/200 |
| 4,223,498 A * | 9/1980 | Ventrice | ......................... | 52/249 |
| 4,244,323 A * | 1/1981 | Morimura | ..................... | 119/223 |
| 4,671,008 A * | 6/1987 | Lindemood | .................... | 43/54.1 |
| 4,860,914 A * | 8/1989 | Derni et al. | ................... | 220/4.28 |
| 5,080,783 A * | 1/1992 | Brown | ...................... | 210/170.05 |
| 5,438,958 A * | 8/1995 | Ericsson et al. | .............. | 119/223 |
| 5,628,279 A * | 5/1997 | Bones, IV | ...................... | 119/215 |
| 5,762,024 A * | 6/1998 | Meilahn | ......................... | 119/223 |
| 5,947,312 A * | 9/1999 | Elstone | ........................... | 220/1.5 |
| 6,539,894 B1 * | 4/2003 | Byrne et al. | ................... | 119/234 |
| 6,739,469 B1 * | 5/2004 | Kim | .............................. | 220/4.12 |
| 6,902,061 B1 * | 6/2005 | Elstone | .......................... | 206/600 |
| 7,284,501 B2 * | 10/2007 | Page | ............................. | 119/223 |

* cited by examiner

*Primary Examiner* — Son T Nguyen (74) *Attorney, Agent, or Firm* — Robert M. Downey, P.A.

(57) ABSTRACT

A floating fish production system for placement within a body of water and being structured and disposed for containing fish and other aquatic animal, plant and algal species, the system including at least one primary containment tank having an arrangement of individual solid wall sections and an arrangement of individual solid floor sections. Flexible membranes span between and connect to adjacently positioned solid wall and floor sections to define flexible connecting joints that allow the individual solid wall and floor sections to move relative to one another in an articulating action. The flexible membranes allow the tank configuration to temporarily deform from a relaxed state in response to externally applied forces exerted on the tank (e.g., waves, wind, current) to thereby absorb the externally applied forces and reduce stress on the structural integrity on the tank. An air lift system including a high volume, low pressure blower and a spaced arrangement of vertically extending air lift pipes delivers water and oxygen from the exterior body of water and into the tank interior. A flexible main drain in a central area at the bottom of the tank connects to a waste recovery system for removing waste produced by the fish and other aquatic species.

16 Claims, 10 Drawing Sheets

AQUACULTURE PRODUCTION SYSTEM

This application is a Continuation-In-Part (CIP) of U.S. patent application Ser. No. 11/307,013 filed on Jan. 19, 2006, now abandoned, which was based on Provisional Patent Application Ser. No. 60/650,296 filed on Jan. 26, 2005.

BACKGROUND OF THE INVENTION

1. Field of the Invention

The present invention relates generally to fish containment systems, tanks, structures, net enclosures, pens and cages or other defined containers, and more particularly to buoyant aquaculture systems, cages, self-contained housings, and floating containment structures for rearing fish, invertebrates, algae, seaweeds, and the like.

2. Discussion of the Related Art

In recent years, the importance of fish in human diets has attained renewed recognition due to dietary research comparing the health benefits, as well as negative health impacts, of fish and other meats. Consumer demand for fish has increased, and commercial farmers have searched for new techniques for producing more fish while minimizing the impact on the environment. Aquaculture, or fish-farming, has gained attention as a viable alternative to commercial harvesting of wild fish populations. Aquaculture is practiced in several different forms, which include land-based aquaculture systems such as open ponds and recirculating tank systems; and open water aquaculture such as net pen/cage systems and floating closed containment systems as described herein. Aquaculture may also increase the availability of seafood and freshwater fish for public food consumption. Aquaculture also reduces the ecological impact of fishing by eliminating the use of nets for harvesting seafood and by reducing the impact of commercial harvesting on wild populations that can produce negative ecological results in a particular marine or freshwater environment.

Net pen/cage aquaculture has been practiced for thousands of years in freshwater lakes and nearshore ocean sites, however over the last 10 years has received tremendous criticism and environmental scrutiny for its highly pollutive effects, and escapism of non-native species into the environment. Further, the pollutive nature of net pen/cage systems has severely limited their applications globally as they cannot be sited/positioned in closed bodies of water such as lakes; areas with low current/tidal exchange; or environmentally sensitive areas. Many commercial farmers, non-governmental and governmental agencies have sought to eliminate the use of net pens/cages and replace them with land and water-based closed containment systems that eliminate pollution and escapement. Aquaculture practices and systems must conform to rapidly expanding environmental legislation in order for the industry to meet global seafood demand.

U.S. Pat. No. 6,539,894, issued to Byrne et al. on Apr. 1, 2003, discloses an aquaculture system particularly designed for the cultivation, containment and growing of various mollusks, and discloses a generally rectangular housing of rigid-molded panels, which include internal openings such that food and mollusks can migrate between chambers. The individual panels constitute interior baffles onto which the mollusks may attach and grow. The '894 patent teaches that the panels are to be constructed of blow-molded plastic, such as polyethylene or similar materials. A foam insert is placed between inner and outer panel sides in a particular embodiment. The closed-cell foam provides the desired buoyancy.

U.S. Pat. No. 5,617,813, issued to Loverich et al. on Apr. 3, 1997, discloses an anchorable and mobile pen system for growing fish, shellfish and the like. The mobile pens are shown in different shapes and utilize a flexible netting form system to enclose the pen between spar buoys. The netting is supported in any desired shape by a supporting ring structure.

U.S. Pat. No. 4,351,269, issued to Rines et al. on Sep. 28, 1982, discloses a training device for various fish species, and is designed to control the congregation and feeding habits of the fish. The focus is to cause the fish to congregate in vertical stacks under light-blocking covers contacting the water, however without defined containers which utilize nets, walls or other barriers to the flow of water. The opaque covers are made from fiberglass or similar materials, and can be arranged in any configuration, including square, rectangular, circular or otherwise. Feed is introduced around the perimeter of the device, or alternatively through centralized tubes.

U.S. Pat. No. 5,762,024 issued to Meilahn on Jun. 9, 1998, describes an aquaculture system having a rigid-walled floating tank that is generally cylindrical with a conical bottom. The '024 patent has a disadvantage in that the tank has a rigid wall that does not articulate and deform in order to absorb the impact of waves and wind. Thus, the '024 invention is more prone to damage by wind and wave action than the articulated, individually moveable tank wall panels of the present invention.

U.S. Pat. No. 4,395,970 issued to Kunkle et al. on Aug. 2, 1982, and U.S. Pat. No. 6,386,146 issued to Knott on May 14, 2002, disclose conventional fish habitats or aquaculture devices utilizing nets, screens, impervious walls and various flotation mechanisms. Many of the references disclose tethering, anchoring and buoyancy systems.

While the above patent references disclose various aquaculture devices and systems, there remains a definite need for an improved fish production system that provides a floating containment tank sectional with flexible membranes spanning between and interconnecting to solid rigid tank wall and floor sections, allowing for articulation and temporary deforming of the tank configuration in response to external forces. The prior art does not disclose, illustrate or suggest many of the components of the instant floating closed containment system, including the generally cylindrical tank enclosure with articulating, individually moveable tank wall and floor sections and a conical-shaped bottom, to promote waste collection and removal.

SUMMARY OF THE INVENTION

Applicant's system comprises an innovative, floating, semi-rigid containment system for intensive aquaculture production that can be used in a variety of deepwater and shallow water applications including lakes, ponds, rivers, estuaries, preformed impoundments (PFI) such as quarries, and other near shore and offshore marine environments. The generally cylindrical tank enclosure is multi-sectional with specialized connecting flexible membranes (such as neoprene) spanning between solid tank wall and floor sections to allow articulation of the wall and floor sections relative to one another so that the tank enclosure is able to temporarily change configuration in response to external forces (e.g. waves, wind, current), thereby absorbing the external forces without undue stress or impact on the structural integrity of the tank enclosure and system. The tank enclosure further includes a conical-shaped bottom for optimal waste collection.

The self-contained aquaculture tank constitutes a floating containment system that is placed within a larger body of water. In this regard, the aquaculture tank functions with the solid waste management characteristics of a recirculation system. To achieve this "hybrid functionality," the prototype aquaculture tank is designed as a semi-rigid, floating structure, constructed of a plurality of articulating plastic (likely fiberglass or polypropylene) wall and floor sections. While the lightweight plastic tank wall and floor sections allow optimum shape and rigidity, the flexible membranes spanning between the tank wall and floor sections provide both directional and torque flexibility to absorb the impact of external forces while maintaining the structural integrity of the tank enclosure and system.

The physical properties of the tank includes a cylindrical shape "with a cone-shaped bottom" and a Cornell style Dual drain. The aquaculture tank is designed with an integrated ballast tank system that allows for controlled submerging of the tank to a desired position within the surrounding body of water, while also allowing for controlled leveling and stabilizing of the tank. Due to its floating design, the conical bottom has a greater degree of pitch than most land based units, thereby permitting the tank to be built deeper.

The unit may include solar energy panels, wave, wind, or another power source to power an electric regenerative air blower for pumping water from the exterior environment into the tank to provide an oxygenated water source for fish and aquatic life contained in the aquaculture tank.

OBJECTS AND ADVANTAGES OF THE INVENTION

Considering the foregoing, the general objects and advantages of the present invention are set forth below.

One object of the invention is to provide a self-contained aquaculture tank habitat for farm-raising aquatic animal, plant, and algal species, including but not limited to, finfish, crustaceans, and seaweed or kelp, that is economically and environmentally superior to current conventional cages and net pens available on the market.

Another important object of the invention is to provide a floating fish production system that can be used in a variety of deep water and shallow water natural environments, and wherein the system includes an articulating fish containment tank having a plurality of solid tank wall and floor sections to provide a desired tank configuration; and the tank further including flexible membranes spanning between and connecting to the solid wall and floor sections to allow the tank to temporarily deform from its normal configuration in response external forces (e.g. waves, wind, current, boat impact), thereby absorbing the external forces and relieving stress on the tank structure.

Another object of this invention is to afford protection from predators to the fish or other aquatic species contained within the aquaculture tank.

Still another object of this invention is to reduce the energy consumption typical for commercial aquaculture by using alternative sources of energy, such as solar, wave and wind power.

Yet another object of the present invention is to provide an aquaculture tank that includes a solid waste recovery and disposal system to reduce negative environmental impact on the body of water in which the invention is located.

A further object of the present invention is to provide an aquaculture tank that will isolate the fish or species contained therein from the external environment to limit or eliminate the effects of adverse aquatic conditions, such as thermal lake inversion or for disease treatment.

Still a further object of this invention is to provide an aquaculture tank that is cost-efficient, easily transported and easily set up for use in remote locations.

In accordance with these and other objects which will become more readily apparent hereinafter, the instant invention will now be described with particular reference to the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 13 illustrates an arrangement of three primary containment tanks connected together by elevated or floating docks or catwalks, and further illustrating submerged flexible pipes connecting between the three tanks for allowing selective movement and transport of fish or other aquatic species from one primary containment tank to another primary containment tank.

Like reference numerals refer to like parts throughout the several views of the drawings.

DETAILED DESCRIPTION OF THE PREFERRED EMBODIMENT

Figure 1:
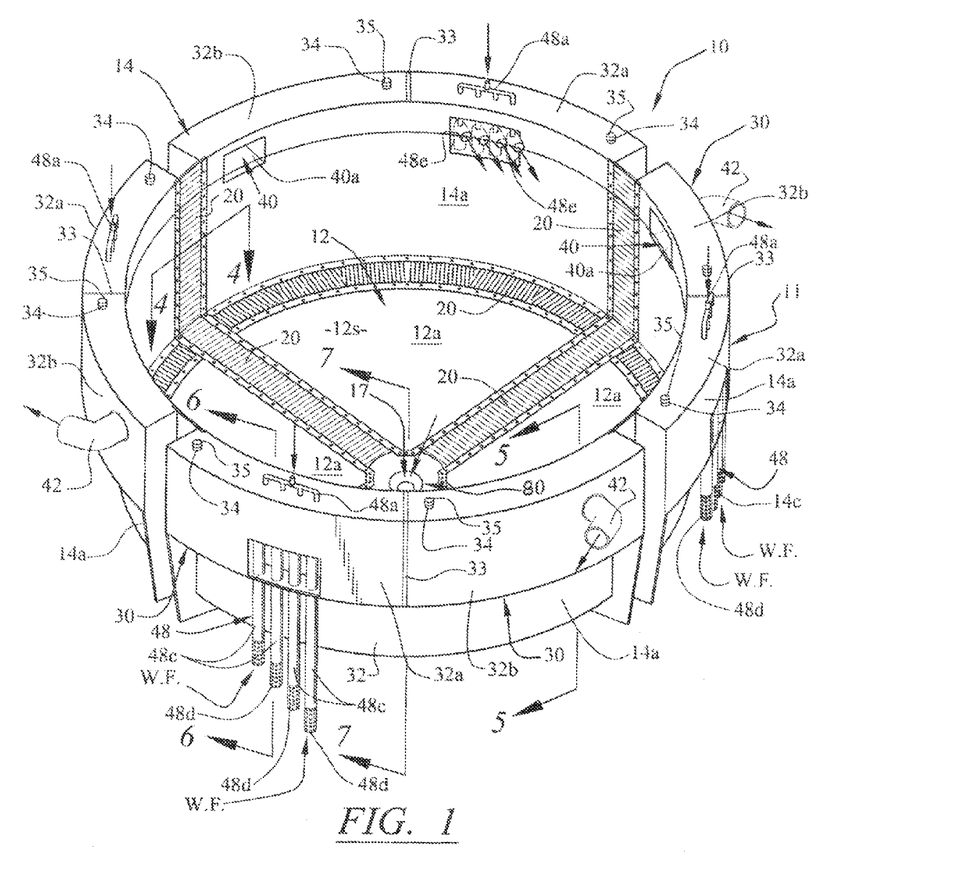
FIG. 1 is a top perspective view showing a primary containment tank and air lift system of the fish production system, according to a preferred embodiment of the present invention.
Figure 10:
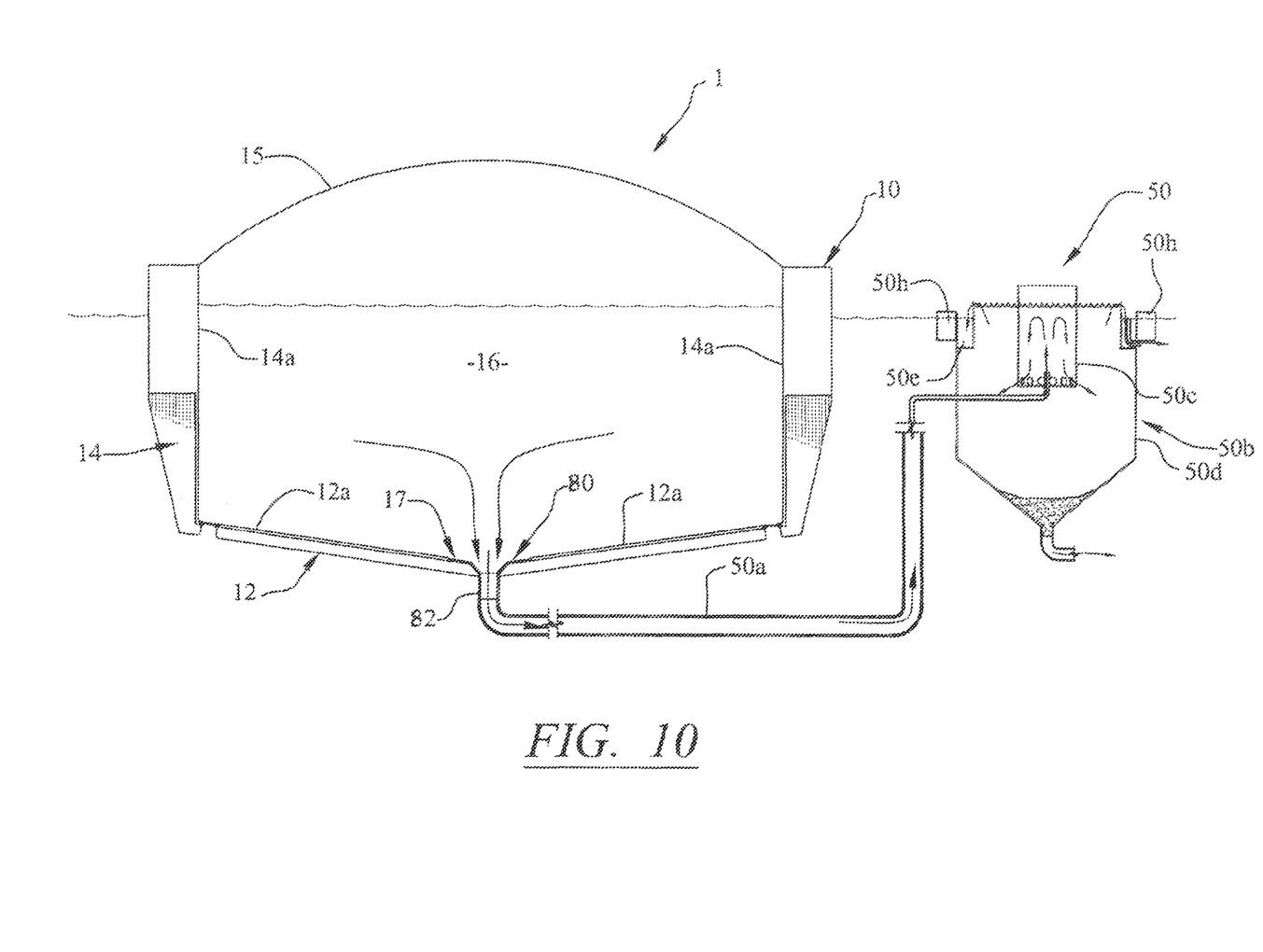
FIG. 10 is a side elevational view in partial cross-section showing the primary containment tank connected to the waste recovery system, including the floating radial flow swirl separator.
Figure 12:
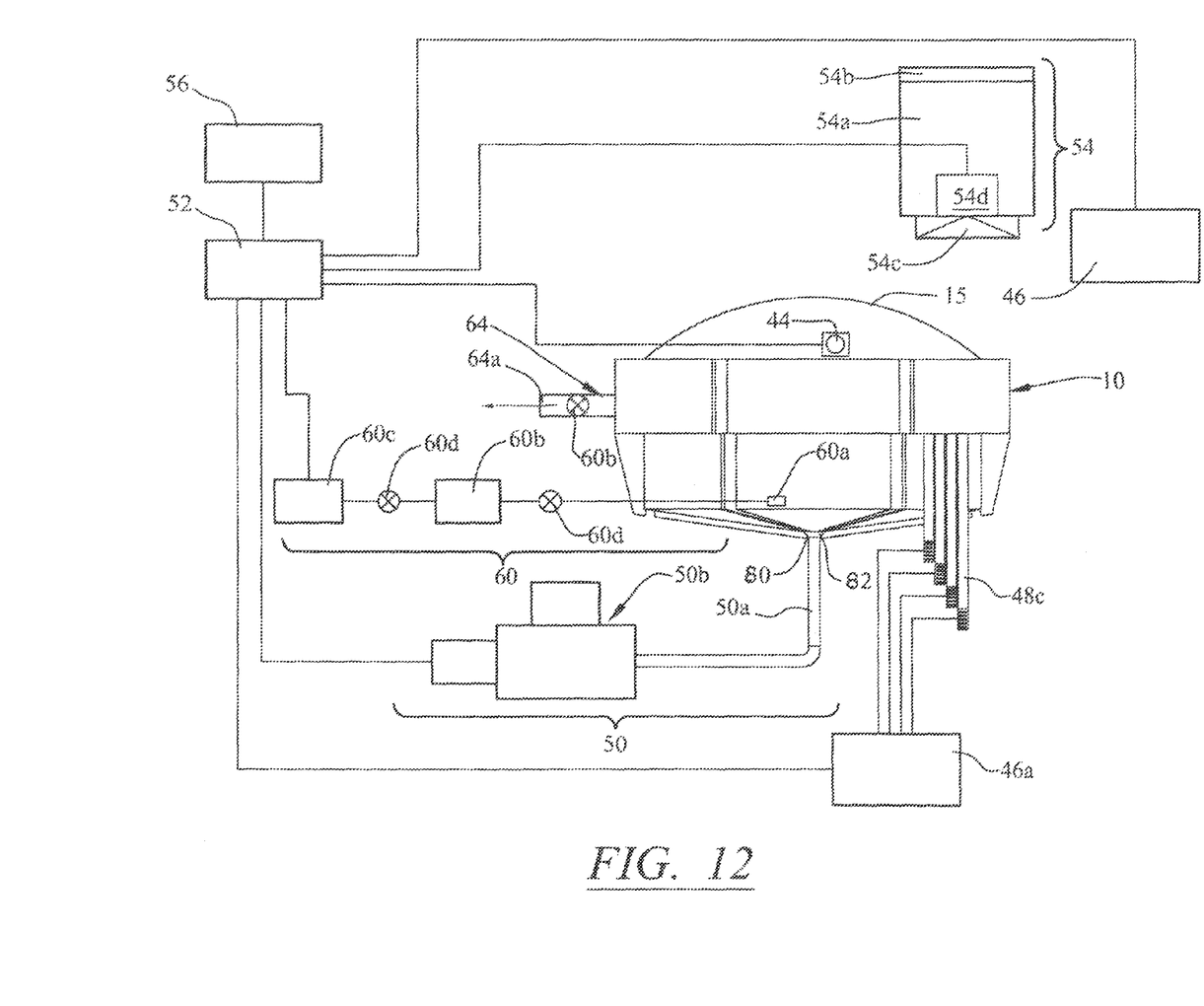
FIG. 12 shows a schematic diagram of the fish production system of the present invention.

The entire floating fish production system is shown in FIGS. 10 and 12 and is generally indicated as 1. Referring initially to FIG. 1, the fish production system 1 includes at least one primary containment tank (also referred to interchangeably as "aquaculture tank"), generally indicated as 10. The primary containment tank 10 is defined by a tank body 11 that has a floor structure 12 and a wall structure 14 extending upwardly from the floor structure 12 to an open top which may be covered by a dome shaped netting or mesh 15, as generally depicted in FIGS. 10 and 12. The floor structure 12 and wall structure 14 surround a tank interior 16 that is adapted to be filled with water taken from a surrounding body of water within which the containment tank 10 is partially submerged, as shown in FIG. 10. The tank interior 16, when filled with water, is adapted for containing fish and other aquatic animal, plant, and algal species, with the primary purpose of producing fish, shrimp, mollusks, algae, etc. for seafood markets and other commercial purposes. The floor structure 12 and wall structure 14 combine to define an overall configuration of the tank body. In a preferred embodiment, the wall structure 14 is generally cylindrical and the floor structure 12 is generally conical in configuration, with an interior surface 12s of the floor structure being sloped downwardly and inwardly from an outer periphery to a lowermost central area 17 having a main drain 80.

Figure 4:
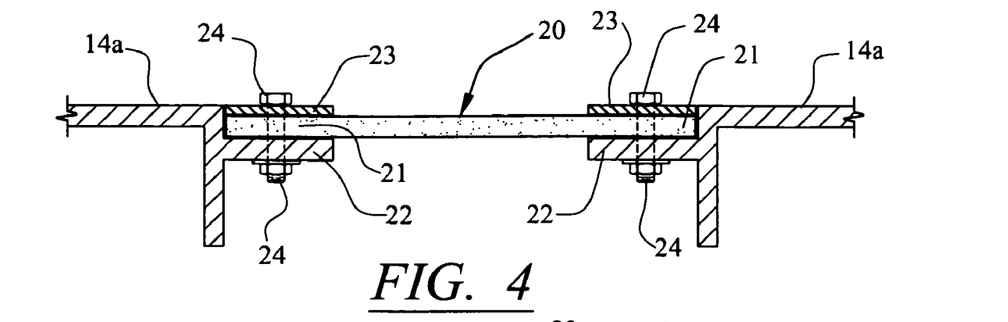
FIGS. 4-4C show an isolated cross-sectional view taken along the plane indicated by the arrows 4-4 in FIG. 1, demonstrating movement of the flexible membrane spanning between and connecting to adjacently positioned individual solid wall or floor sections, and further illustrating the manner of attachment of the flexible membrane to the adjacently positioned solid wall or floor sections.
Figure 4A:
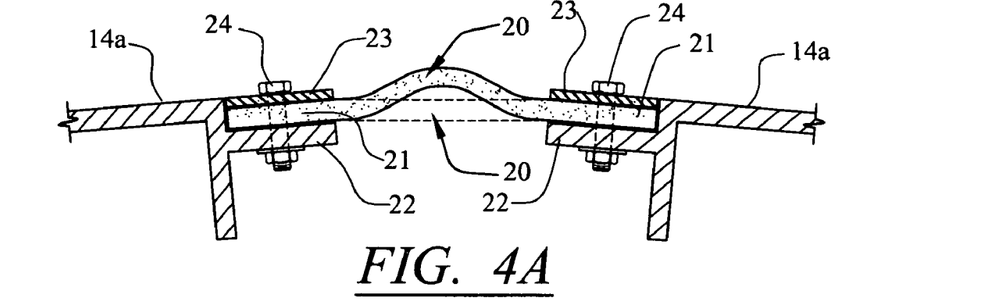
Figure 4B:
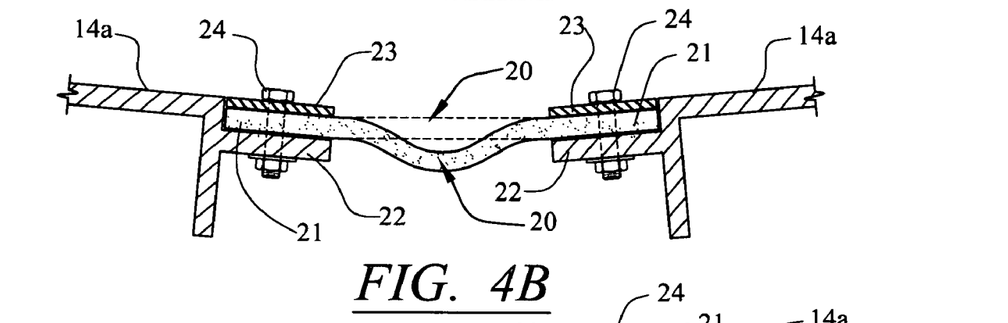
Figure 4C:
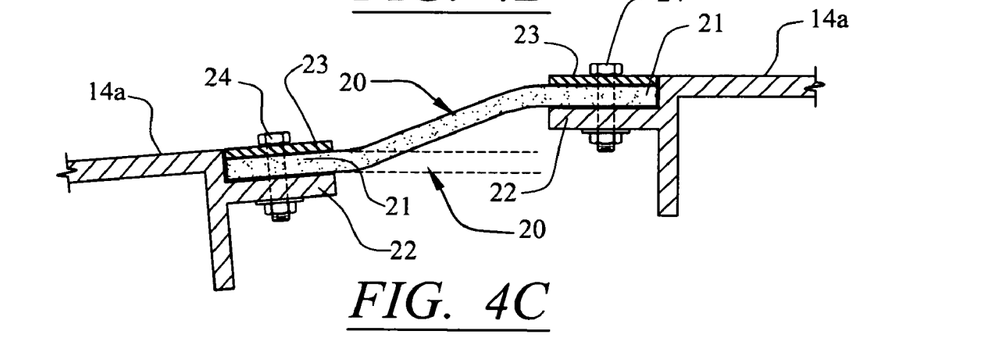
Figure 5:
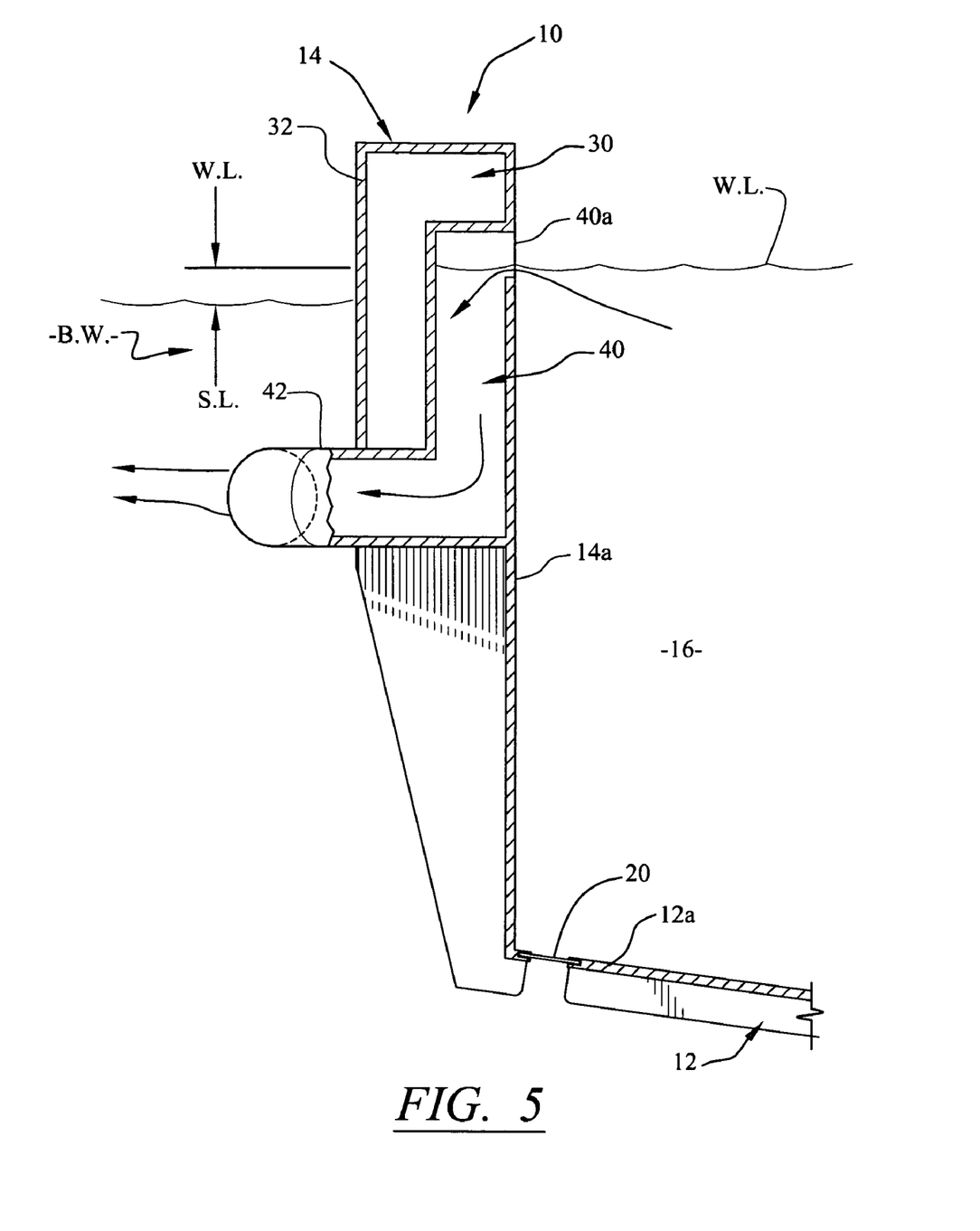
FIG. 5 is an isolated cross-sectional view taken along the plane indicated by the arrows 5-5 in FIG. 1, showing a surface drain system for draining water from an upper portion of the primary containment tank interior for discharge at a remote exterior location.

The wall structure 14 and floor structure 12 of the primary containment tank 10 are constructed to allow for articulating movement and temporary deforming of the tank configuration in response to external forces exerted on the aquaculture tank 10. To achieve this desired function, the wall structure 14 includes a plurality of individual solid wall sections 14a. Similarly, the floor structure includes a plurality of individual floor sections 12a. As seen in FIGS. 1 and 4-4C, the individual solid wall and floor sections are interconnected by elongate flexible membranes 20 that span transversely between and connect to adjacently positioned floor and wall sections to define flexible joints therebetween. The flexible membranes 20 allow each of the individual solid wall and floor sections 14a, 12a to move relative to one another in response to the external forces (e.g. waves, wind, current, impact) exerted on the containment tank. As seen in FIGS. 4-4C, each flexible membrane 20 spans between two adjacently positioned floor 12a or wall 14a sections. Opposite longitudinal edge portions 21 of the flexible membrane 20 rest on top of a flanged lip 22 of the adjacently positioned solid floor or wall sections. A fastener plate 23 is then positioned on the opposite side of the membrane 20, along the longitudinal edge portions 21, as seen in FIGS. 4-4C, so that the longitudinal edge portions 21 of the flexible membrane 20 are sandwiched between the flanged lip 22 and the fastening plate 23. Conventional fasteners 24, such as stainless steel bolts, nuts, and washers are used to secure the sandwiched construction of the fastening plate 23, flexible membrane 20 and flanged lip 22 together, thereby effectively connecting the flexible membrane 20 to the adjacently positioned solid floor and wall sections 12a, 14a. As seen in FIG. 1, the flexible membranes 20 extend along the entire gap between adjacently positioned solid floor and wall sections, effectively closing the space between adjacent floor and wall sections. The flexible membranes 20 are secured using the fastening plates 23 and placement of bolts, nuts and washers (i.e., fasteners) 24 at spaced intervals along the opposite longitudinal edge portions 21.

Figure 2A:
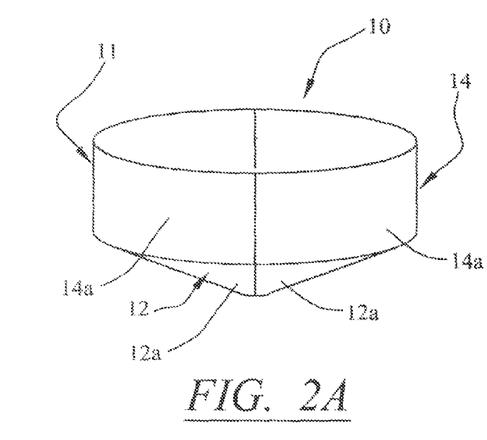
FIG. 2A is a general diagram showing a general configuration of the primary containment tank in a relaxed state.
Figure 2B:
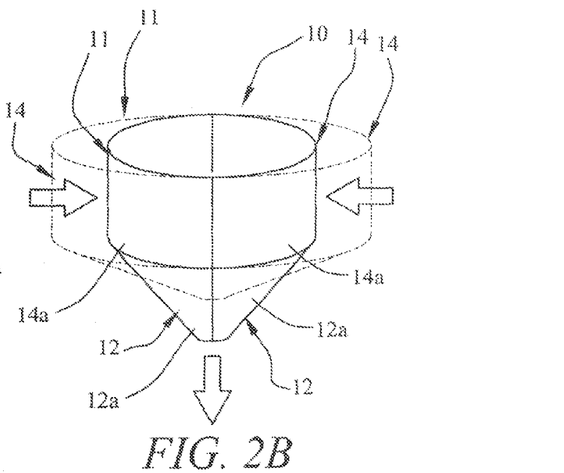
FIG. 2B is a general diagram illustrating temporary deforming of the tank configuration along a vertical plane in response to external forces exerted on the tank, as indicated by the arrows.
Figure 3A:
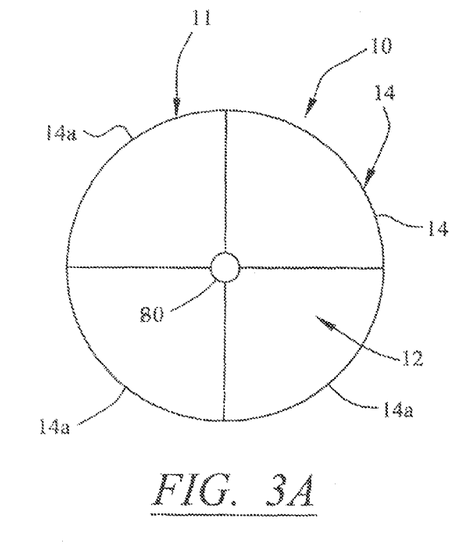
FIG. 3A is a general diagram illustrating the general configuration of the primary containment tank from a top plan view, representing the normal tank configuration in the relaxed state taken along the horizontal plane.
Figure 3B:
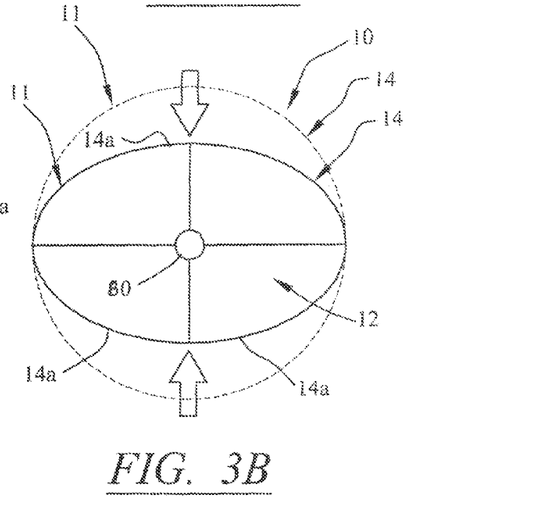
FIG. 3B is a general diagram of the primary containment configuration, in a top plan view, illustrating temporary deforming of the normal tank configuration along the horizontal plane in response to external forces exerted on the tank, as illustrated by the arrows.

FIGS. 4-4C demonstrate the flexibility of the membranes 20 between adjacently positioned solid floor and wall sections 12a, 14a, allowing the solid floor and wall sections to bend inwardly and outwardly relative to one another, as well as to be displaced or offset to one another. Specifically, FIGS. 4-4C show two adjacently positioned wall sections 14a separated from one another by a gap and with the flexible membrane 20 connected to the flanged lip 22 of each wall section 14a and spanning the gap. This same connection of the flexible membrane 20 is made between two adjacently positioned floor sections 12a as well as adjacently positioned floor and wall sections (e.g., about the outer perimeter of the floor structure). This allows the overall tank body 11 to temporarily deform from a normal relaxed configuration to an altered configuration in response to external forces exerted on the aquaculture tank 10. The ability of the tank configuration to deform is demonstrated in FIGS. 2A-3B. More specifically, FIGS. 2A and 2B illustrate the ability of the containment tank configuration to deform along the vertical plane in response to external forces exerted on the exterior of the containment tank 10. Specifically, in FIG. 2A, the tank configuration is shown in a relaxed state. In FIG. 2B, external forces exerted on the exterior of the containment tank, as indicated by the arrows, causes the tank configuration to stretch vertically, becoming more narrow and elongated from top to bottom. FIGS. 3A and 3B demonstrate deforming of the tank configuration along a horizontal plane, causing the tank configuration to deform from a circular configuration to a generally oval configuration, in response to the externally applied forces indicated by the arrows in FIG. 3B.

In a preferred embodiment, the flexible membranes 20 are constructed from a durable, flexible, water and UV resistant elastomer or plastic material, such as polyurethane or polypropylene, and preferably from neoprene. In the most preferred embodiment of the invention, the flexible membranes 20 are manufactured from EPDM, a type of neoprene. The flexible material forming the membranes 20 may further include a rigid, yet flexible, inner mesh (not illustrated in the drawings) comprised of fiberglass, steel, titanium, or another suitable metal or other material that is laminated within layers of the neoprene material.

Figure 6:
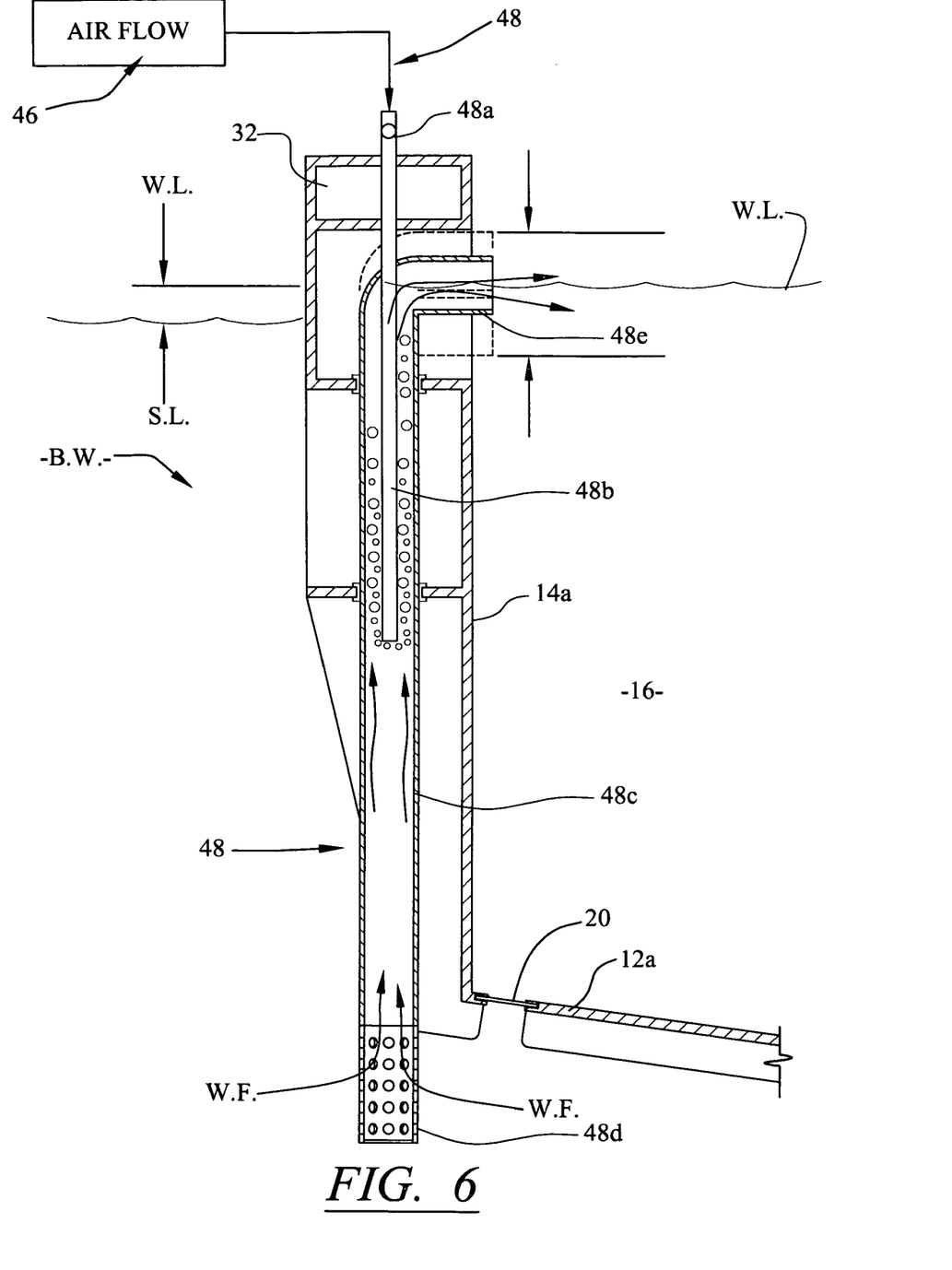
FIG. 6 is an isolated cross-sectional view taken along the plane indicated by the arrows 6-6 in FIG. 1, showing an air lift system of the present invention for pumping water from an exterior water environment surrounding the primary containment tank and into an interior of the containment tank.
Figure 7A:
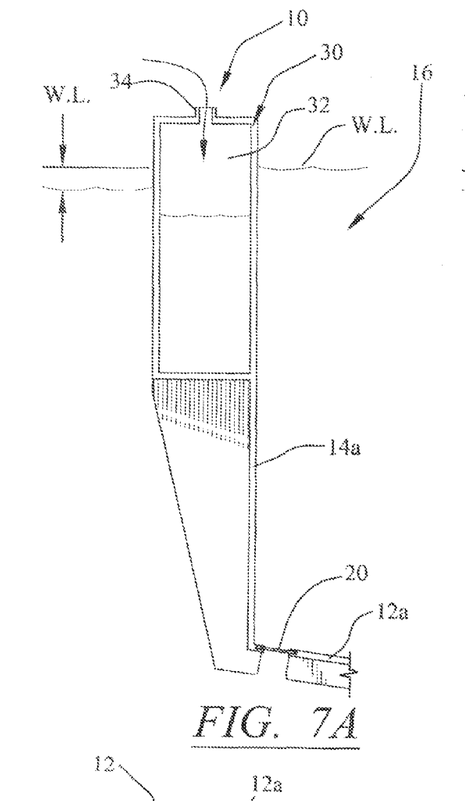
FIG. 7A is a cross-sectional view taken along the plane indicated by the arrows 7-7 in FIG. 1, showing a ballast tank having a first amount of water that is filled through a top ballast fill port in order to submerge the primary containment tank deeper within the surrounding body of water.
Figure 7B:
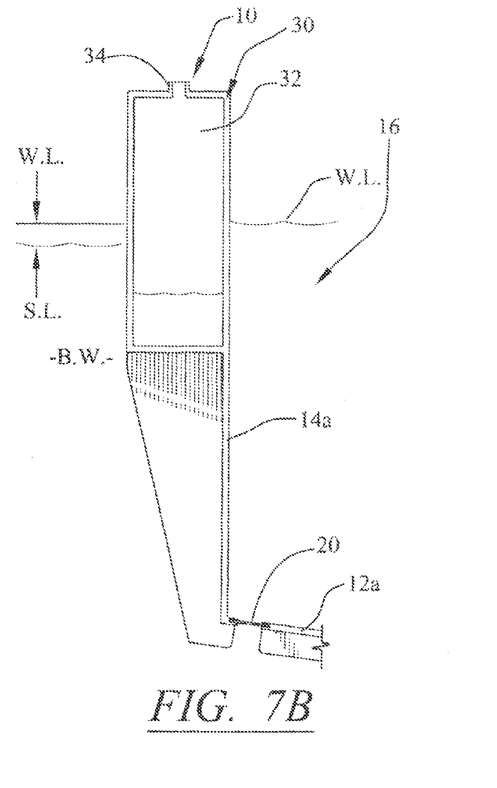
FIG. 7B is a cross-sectional view taken along the plane indicated by the arrows 7-7 in FIG. 1 showing the interior of a ballast tank with less water and more air herein, as compared to FIG. 7A, causing the primary containment tank to sit higher in the surrounding body of water.

The primary containment tank 10 further includes a ballast system 30 for controlling the level of submersion of the containment tank 10 within the surrounding body of water BW and for stabilizing the position of the containment tank 10 within the body of water BW so that the tank 10 sits generally level and with the water level WL in the tank 10 at the desired position around the entire periphery of the tank interior 16 and higher than the surface level SL of the surrounding body of water BW exterior of the tank 10, as shown in FIGS. 5-7B. This allows for optimal water flow into the tank 10, as well as optimal drainage of water out through surface drains 40 around the tank wall structure 14. The ballast system 30 includes a plurality of ballast tanks 32 that are integrally formed with the individual solid wall sections 14a. In a preferred embodiment, each of the solid wall sections 14a includes two segregated ballast tanks 32a and 32b that are separated by a vertical dividing wall 33. Referring to FIGS. 7A and 7B, each ballast tank (32a, 32b) has a ballast fill port 34 at the top. The ballast fill port is normally covered with a cap 35 or cover that screws onto or otherwise secures to the fill port 34 in order to close the fill port 34. The cap 35 is removed in order to fill water into each ballast tank or remove water from each of the ballast tanks (32a, 32b). By filling or removing water, the level of partial submersion of the containment tank 10 within the surrounding body of water BW can be controlled. Further, by removing water or adding water to various ones of the several ballast tanks, the pitch of the containment tank 10 can be controlled in order to achieve the optimal leveling positioning of the containment tank 10 within the surrounding body of water BW. Also, the water level WL within the containment tank can be kept at the desired even level for optimal water flow into and out of the containment tank 10. FIG. 7A demonstrates movement of the containment tank 10 deeper into the surrounding body of water BW as water is filled into the ballast tank 32 through the fill port 34. Accordingly, as more water is filled within the ballast tanks (32a, 32b), the containment tank 10 is submerged deeper into the surrounding body of water BW as shown in FIG. 7A. Removing water from the ballast tanks (32a, 32b), as seen in FIG. 7B, causes the containment tank 10 to rise upwardly relative to the surrounding body of water BW.

In the preferred embodiment, the solid floor and wall sections 12a, 14a, including the ballast tanks (32a, 32b), are formed of a rigid polypropylene or fiberglass composition.

Referring to FIGS. 1 and 6, a water pumping system for delivering water from the exterior body of water BW and into the tank interior includes a high volume, low pressure air blower 46 that delivers an air flow to several air lift manifolds 48a of an air lift system 48 either directly or with the use of one or more regenerative blowers 46a (see FIG. 12). As seen in FIG. 1, the air lift manifolds 48a are positioned at spaced locations about the top of the tank 10, extending upwardly from the solid wall sections 14a above the ballast tanks 32. Each of the air lift manifolds 48a connects to several air delivery tubes 48b. In a preferred embodiment, each air lift manifold 48a connects to four air delivery tubes 48b that extend downwardly through the tops of the solid wall sections 14a and into respective air lift pipes 48c. The air lift pipes 48c extend vertically on the exterior of the tank 10, downwardly through the ballast tanks 32 and exiting the bottom of the ballast tanks exterior to the solid wall sections 14a, as seen in FIGS. 1 and 6. A lower distal end portion 48d of each of the air lift pipes 48c is adjustably positionable at a desired depth within the surrounding body of water BW and is adapted to receive an inwardly directed flow of water WF from the exterior body of water BW upwardly through the air lift pipe 48c. More specifically, air flow delivered through the air delivery tubes 48b creates an uplift to pull water upwardly through the bottom distal ends 48d of the air lift pipes 48c and outwardly through a water inlet multi-directional fitting 48e at the top end of each of the air lift pipes 48c. The multi-directional water inlet fittings 48e at the top of each of the air lift pipe 48c are adjustably positionable relative to the water level WL to achieve an optimal position so that the water level WL is generally halfway up the opening of the water inlet fitting 48e (50% submergence). This achieves maximum water flow into the tank 10 to maintain a desired water level WL in the tank with a constant supply of clean oxygenated water from the exterior body of water BW. The water inlet multi-directional fittings 48e are further positionable at a desired angle, as seen in FIG. 1, to generate a cyclonic flow that spirals downwardly towards the bottom of the tank 10 and towards the central area 17 and main drain 80, thereby urging waste from fish and other aquatic species contained within the tank interior 16 towards the main drain 80 for exit therethrough.

The solid tank wall sections 14a are further provided with surface drains 40 including a drain opening 40a formed through the tank wall sections 14a and ballast tanks 32 and connecting to a water discharge pipe 42. The surface drains 40 allow water to continuously exit the tank interior 16. This allows for the continuous replenishment of oxygenated water through the air lift system 48 as surface water is allowed to exit the tank interior, thereby maintaining the desired water level WL within the tank interior 16, while also achieving a continuous flow of clean oxygenated water into the tank interior.

Figure 11:
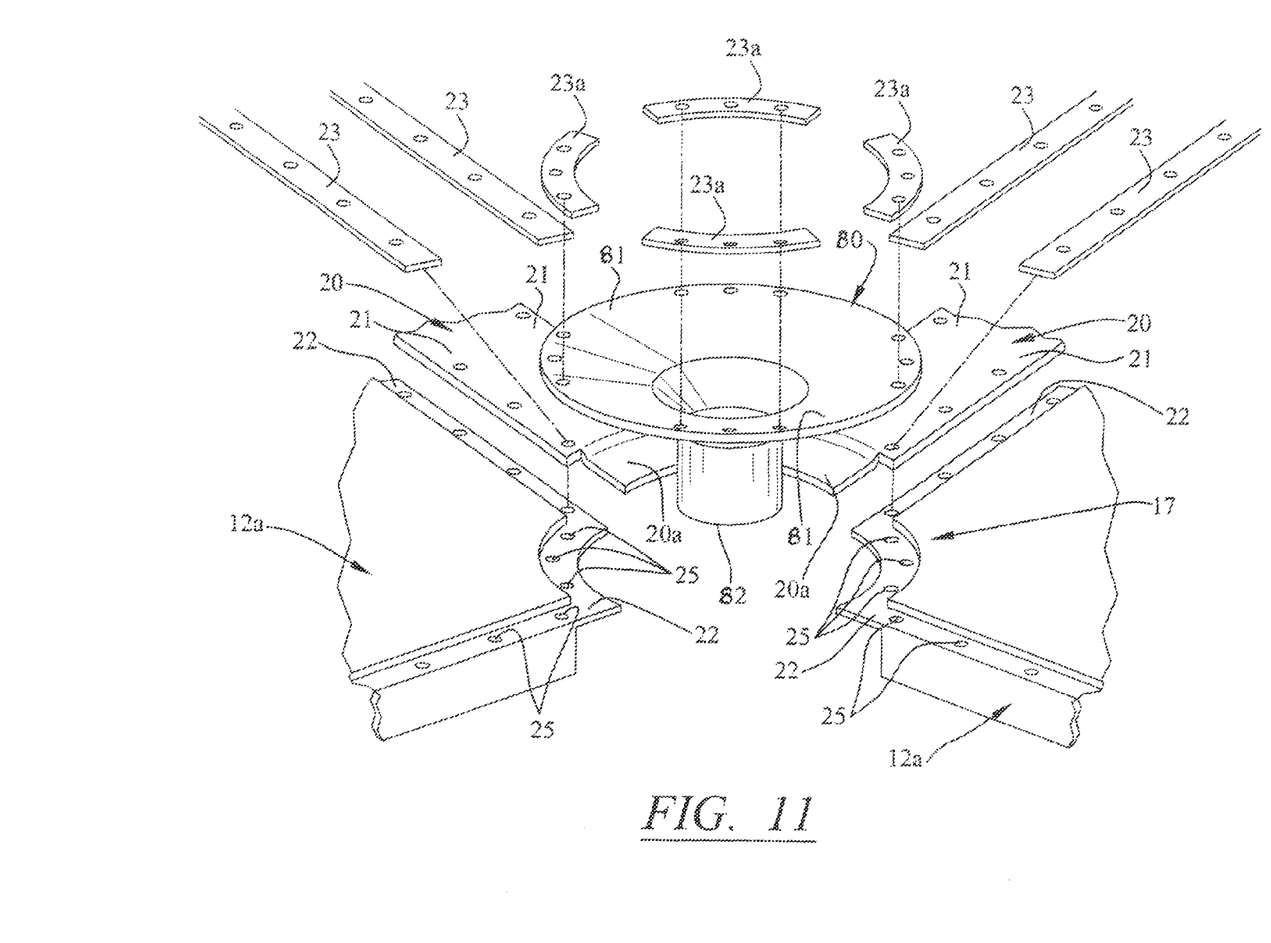
FIG. 11 is an isolated exploded perspective view showing the assembly of individual solid floor sections, flexible membranes and a flexible center drain in the floor of the primary containment tank.

FIG. 11 shows a flexible main drain 80 that connects to the solid floor sections. Specifically, the outer periphery 81 of the flexible main drain 80 rests on the flanged lip 22 of the floor sections 12a, at a central area 17 of the tank floor structure 12. The flexible membranes 20 are secured at the main drain area with a tongue 20a of the membranes 20 extending under the outer periphery 81 of the flexible main drain 80. As described above, fastening plates 23 are secured along the top longitudinal edge portions 21 of the flexible membrane 20. Similarly, curved arcuate fastening plates 23a are placed over the top outer periphery 81 of the flexible main drain 80 and secured in the same manner using bolts and nuts 24 (i.e., fasteners) that extend through the fastening plates 23, 23a, the flexible main drain 80 and/or flexible membranes 20 and through apertures 25 formed in the flanged lip 22 of the floor sections 12a. The manner of attachment using the bolts, nuts and washers (collectively 24 (is clearly shown in FIGS. 4-4C.

Figure 8:
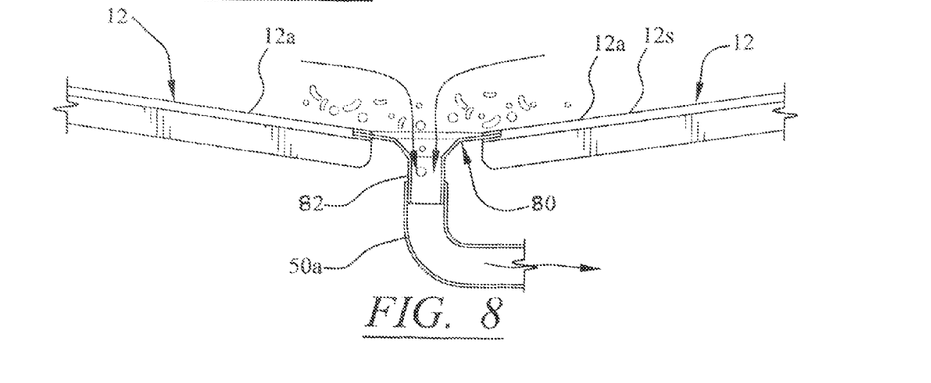
FIG. 8 is an isolated cross-sectional view of a floor of the primary containment tank showing a flexible main drain and connecting conduit for removing waste from the interior of the primary containment tank.
Figure 9:
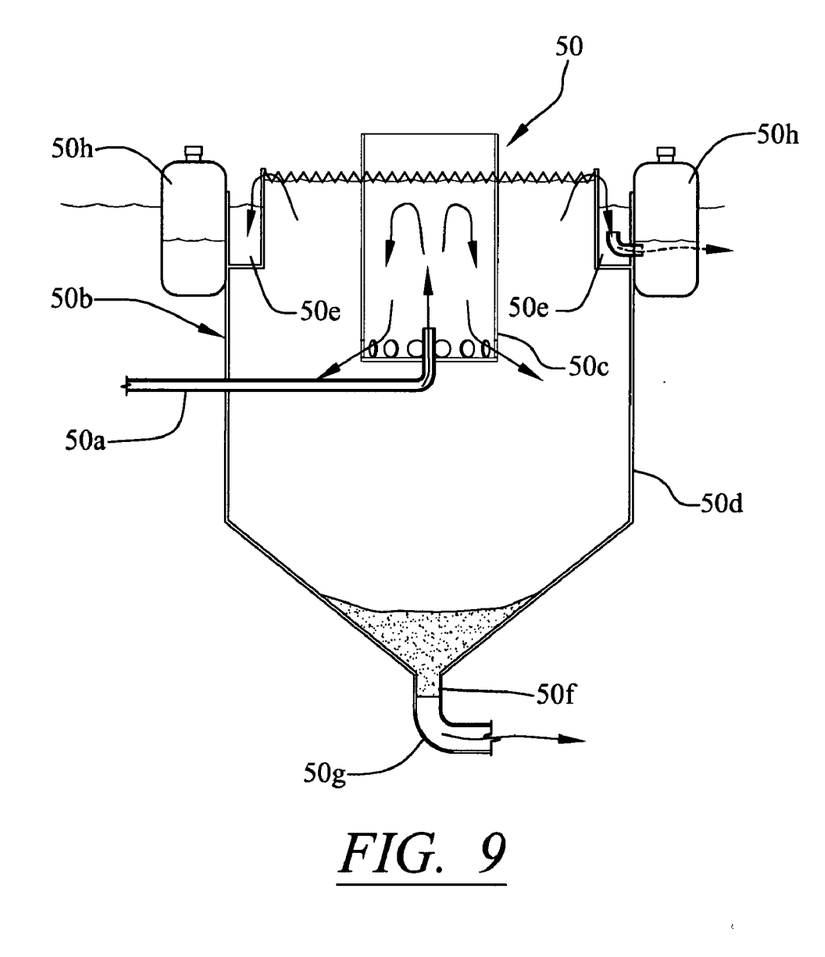
FIG. 9 is a cross-sectional view showing a solid waste separation system including a floating radial flow swirl separator that receives waste and water that exits the main drain of the primary containment tank; the radial flow separator being structured and disposed for separating the solid waste from the water.

A central drain aperture 82 of the center drain 80 connects by a flexible conduit 50a to a waste recovery system 50, as shown in FIGS. 8-10. Specifically, floating a radial flow swirl separator 50b includes a central cylinder 50c that receives a flow of waste and water from the main drain 80. The central cylinder 50c allows the waste to collect and fall to the bottom of a settling tank 50d, as clean water rises to the top and spills over into an annular gutter 50e surrounding the settling tank 50d. The clean water then exits the annular gutter. Solid waste settling at the bottom of the settling tank, as shown in FIG. 8, is removed through a bottom opening 50f of the settling tank and through a conduit 50g to a remote location. The waste is then captured and may be utilized as fertilizer to grow hydroponic crops, seaweeds, or algae. The waste recovery system 50 includes ballast tanks 50h on the outboard sides of the settling tank 50d to allow for controlled and stabilized flotation in the same general manner as described in connection with the ballast system 30 of the containment tank 10.

Preferably, the aquaculture tank 10 also includes an automated feeding system 54 to provide food to the fish or other aquatic species contained therein. Referring to FIG. 12, the feeding system may compromise a synthetic hopper 54a having a holding capacity preferably within a range of 100 to 1,000 pounds, although larger or smaller capacity hoppers may also be used. The feeding system 54 further comprises a hinged, weather-sealed feed loading door 54b located at the top of the hopper 54a, a propeller 54c for dispensing feed from the hopper 54a, a low-voltage motor 54d for rotating the propeller 54c, a battery bank and source of power 56 to drive the motor 54d, and a programmable timing circuit 52 to ensure that feed is released into the tank 10 at predetermined intervals of time. The feeding system 54 can release predetermined amounts of feed up to twenty times per day. A solar panel may be used to provide a portion or all of the energy for the feeding system 54. Feed may be loaded into the hopper 54a of the feeding system 54 either manually or by a mechanical system. The timing circuit 52 is programmed to activate the motor 54d a predetermined number of times each day for a specific period of time during each activation. When the motor 54d is activated, the feed drops through an aperture in the bottom of the hopper 54a and is spread over a predetermined area within the tank enclosure 12 by the spinning of the propeller 54c. The size of the feeding area over which feed is spread by the propeller 54c can be modified by adjusting the speed at which said propeller spins.

In addition to the air blower 46 or pump, the aquaculture tank 10 includes an oxygen injection system 60, which is designed to operate independently from said air pump 46. The oxygen injection system 60 is illustrated in FIG. 12. Moreover, the oxygen injection system 60 is used to significantly increase the amount of dissolved oxygen present in the water within the tank, and therefore allow greater densities of fish to be produced. The oxygen injection system also serves as an emergency back-up system that isolates the aquaculture tank 10 from the external environment of the surrounding body of water by providing an internal source of oxygen, thereby eliminating the reliance on the surrounding body of water as a source of oxygen for said tank 10. Said oxygen injection system 60 comprises an oxygen diffusion system 60a placed at the bottom of the tank enclosure 12. The oxygen diffusion system 60a may be comprised of diffuser hoses, micro-pore air stones, or any other similar aeration device that can be used to distribute oxygen or air through a body of water. An oxygen tank 60b, an oxygen generator 60c, an oxygen compressor (not shown in the drawings), or, all three of these components may be located near the aquaculture tank 10 to supply or produce a source of oxygen to the oxygen injection system 60. Oxygen supply distribution may be controlled automatically or manually through a series of valves, solenoid valves, or any other suitable means 60d for controlling oxygen supply flow. The valves 60d are also used to distribute oxygen from the oxygen generator 60c to the oxygen tank 60b. Depending upon the needs of the user, one or more oxygen tanks 60b may be maintained adjacent to the aquaculture tanks 10 to store oxygen produced by the oxygen generator 60c and to supply oxygen to the aquaculture tanks 10 through the oxygen injection system 60.

The aquaculture tank 10 includes a power source 56 that is preferably harnessed from an alternative energy source, such as solar, wave, or wind energy to power lights 44, water or air pumps, and any other electrical or mechanical components incorporated as part of said aquaculture tank 10. However, any suitable power source 56 may be utilized, including electrical connections or fuel-supplied generators. The power source 56 may also be located on floating docks 62 that connect multiple aquaculture tanks (see FIG. 13), or the power source may be located on land and connected by wires or other appropriate means to the electrical and mechanical components of the aquaculture tank. The same power source 56 or multiple power sources may be used to power any or all of the electrical and mechanical components of the invention.

In one preferred embodiment of the invention, several aquaculture tanks 10 are interconnected by docks, catwalks, or gangways 62 either elevated above or floating on the surface of the body of water in which said aquaculture tanks 10 are located. The arrangement of two or more aquaculture tanks 10 within the body of water in certain predetermined configurations allows for maximum use of the available surface area in the body of water. As shown in FIG. 13, the aquaculture tanks 10 may be arranged and interconnected in a group of three. However, any number of said tanks may be arranged in any geometric configuration and be interconnected by floating docks and tubes or pipes for moving fish from one tank to another. Said aquaculture tanks 10 may be serviced from a land-connected floating dock with additional floating docks 62 positioned around the perimeter of the aquaculture tanks 10 for improved access. Access to each aquaculture tank 10 is necessary for maintenance, supplying food, and for observation of the fish or other species. An aquaculture tank 10 or groups of aquaculture tanks may also be anchored in bays or offshore areas of a body of water. When anchored offshore, a centralized platform 62, shown in FIG. 13, may provide access to the group of interconnected tanks 10. A service barge may be used to supply and provide access to aquaculture tanks anchored in offshore areas not connected to land by a floating dock. When floating docks 62 are used to provide access to the tanks 10, said floating docks 62 may be connected to the aquaculture tanks 10 by flexible connecting means, such as hinges, bungee cords, nylon ropes, or any other suitably strong and flexible material. The connecting means chosen must allow both the tank 10 and the floating dock 62 to rise and fall with changes in water level produced by tides and wave action. Tank floatation is controlled solely by the tank's ballast system and is not dependent upon the floating docks. The floating docks provide a working platform to feed and service said tanks, and keep the formation of multiple tanks together in shape.

The grouped aquaculture tanks 10 each include a porthole gate valve interface 64 for moving and transporting fish between tanks 10. As illustrated in FIGS. 12 and 13, the porthole gate valve interface 64 comprises a flexible pipe 64a having a valve 64b connected to and passing through an aperture through a solid tank wall section on each of two adjacent aquaculture tanks 10. Said porthole gate valves 64b may be opened or closed as desired by the user to allow movement and transport of fish or other aquatic species from one aquaculture tank 10 to another aquaculture tank 10.

A software program and timing circuit 52 (shown in FIG. 12) or sensors can be used to automatically control the operation of any electrical or mechanical components, such as air pumps, water pumps, feeding system, oxygen injection system, solid waste recovery system, or lights, included as a part of the invention.

The instant invention has been shown and described herein in what is considered to be the most practical and preferred embodiments. It is recognized, however, that departures may be made therefrom within the scope of the present invention, as defined in the following claims.

What is claimed is:

1. A floating fish production system for placement within a body of water, said system comprising:
    at least one primary containment tank having a tank body with a first configuration in a relaxed state, and said at least one primary containment tank being partially submersible within the body of water and including a floor structure and a wall structure extending upwardly from said floor structure to a top of said primary containment tank, and said floor and wall structures surrounding a tank interior adapted to be filled with water taken from said body of water for containing fish and other aquatic animal, plant and algal species therein, and said floor structure having a surface configuration within said tank interior that slopes from an outer periphery downwardly towards a central area at a bottom of said tank interior;

said floor structure including a plurality of individual solid floor sections;

said wall structure including a plurality of individual solid wall sections;

a plurality of elongate flexible membranes each spanning transversely between and connecting to adjacently positioned pairs of said individual solid floor and wall sections and defining flexible joints therebetween for allowing each of said plurality of individual solid floor and wall sections to move relative to a remainder of said plurality of individual solid floor and wall sections in response to external forces exerted on said tank body, and said plurality of elongate flexible membranes being structured and disposed for allowing said tank body to temporarily deform from said first configuration to an altered configuration in response to the external forces exerted on said tank body, and said plurality of elongate flexible membranes being further structured and disposed for urging said plurality of individual solid floor and wall sections to assume said first configuration of said tank body upon removal of said exerted external forces;

a ballast system for controlling a level of submersion and stable positioning of said at least one primary containment tank within said body of water, and said ballast system including a plurality of ballast tanks integrally formed with at least some of said plurality of individual solid wall sections; and a main drain in the central area at the bottom of said tank interior and including a drain aperture for passage and removal of waste produced by the fish and other aquatic species contained within said tank interior; and a water pumping system for delivering the water from the exterior body of water and into said tank interior, said Water pumping system comprising: a high volume, low pressure blower for generating an air flow; an air lift system connected to said blower for receiving the air flow, and said air lift system including a plurality of air lift pipes extending vertically and including a lower distal end portion adapted to be positioned within the exterior body of water at a select depth below a surface of the body of water, and a water inlet fitting at a top proximal end of each of said plurality air lift pipes, and said air lift system being structured and disposed for delivering the flow of air into said plurality of air lift pipes for lifting water up through the lower distal end portion of each of said plurality of air lift pipes and out through said water inlet fitting at the top of each of said plurality of air lift pipes for filling the water into said tank interior.

2. The floating fish production system as recited in claim 1 wherein said water inlet fitting of each of said plurality of air lift pipes is adjustably and selectively positionable for directing the water into said tank interior at an optimal direction in order to generate a cyclonic flow that spirals downwardly towards said tank bottom and said main drain to thereby urge the waste towards the bottom of the tank and the central area and out through said drain aperture.

3. The floating fish production system as recited in claim 2 further comprising:

a waste recovery system including a waste separator system structured and disposed for separating the waste from water; and a conduit connecting between said drain aperture at said main drain and said waste recovery system for delivering the waste from said tank interior to said waste separator system.

4. The floating fish production system as recited in claim 3 wherein said main drain includes a flexible cone including said drain aperture, said flexible cone being connected to at least some of said plurality of said individual solid floor sections.

5. The floating fish production system as recited in claim 4 further comprising:

at least one surface drain extending through at least of one said plurality of individual solid wall sections for draining the water from said tank interior.

6. The floating fish production system as recited in claim 1 wherein said plurality of elongate flexible membranes are constructed from a water resistant elastomer material.

7. The floating fish production system as recited in claim 6 wherein said water resistant elastomer material is neoprene.

8. The floating fish production system as recited in claim 7 wherein each of said plurality of elongate flexible membranes spans transversely across a gap separating the adjacently positioned individual solid floor and wall sections.

9. A floating fish production system for placement within a body of water, said system comprising:

at least one primary containment tank having a tank body with a first configuration in a relaxed state, and said at least one primary containment tank being partially submersible within the body of water and including a floor structure and a wall structure extending upwardly from said floor structure to a top of said primary containment tank, and said floor and wall structures surrounding a tank interior adapted to be filled with water taken from said body of water for containing fish and other aquatic animal, plant and algal species therein;

said floor structure including a plurality of individual solid floor sections;

said wall structure including a plurality of individual solid wall sections;

a plurality of elongate flexible membranes each spanning transversely between and connecting to adjacently positioned pairs of said individual solid floor and wall sections and defining flexible joints therebetween for allowing each of said plurality of individual solid floor and wall sections to move relative to a remainder of said plurality of individual solid floor and wall sections in response to external forces exerted on said tank body, and said plurality of elongate flexible membranes being structured and disposed for allowing said tank body to temporarily deform from said first configuration to an altered configuration in response to the external forces exerted on said tank body, and said plurality of elongate flexible membranes being further structured and disposed for urging said plurality of individual solid floor and wall sections to assume said first configuration of said tank body upon removal of said exerted external forces;

a ballast system for controlling a level of submersion and stable positioning of said at least one primary containment tank within said body of water; and a main drain in the central area at the bottom of said tank interior and including a drain aperture for passage and removal of waste produced by the fish and other aquatic species contained within said tank interior; and a water pumping system for delivering the water from the exterior body of water and into said tank interior, said Water pumping system comprising: a high volume, low pressure blower for generating an air flow; an air lift system connected to said blower for receiving the air flow, and said air lift system including a plurality of air lift pipes extending vertically and including a lower distal end portion adapted to be positioned within the exterior body of water at a select depth below a surface of the body of water, and a water inlet fitting at a top proximal end of each of said plurality air lift pipes, and said air lift system being structured and disposed for delivering the flow of air into said plurality of air lift pipes for lifting water up through the lower distal end portion of each of said plurality of air lift pipes and out through said water inlet fitting at the top of each of said plurality of air lift pipes for filling the water into said tank interior.

10. The floating fish production system as recited in claim 9 wherein said floor structure of said at least one primary containment tank has a generally concave surface configuration within said tank interior that slopes downwardly and inwardly from an outer periphery of said floor structure and towards a central area of said floor structure at a bottom of said tank interior.

11. The floating fish production system as recited in claim 10 wherein said ballast system further comprises:

a plurality of ballast tanks integrally formed with at least one of said plurality of individual solid wall sections, and said plurality of said ballast tanks being structured and disposed to be individually filled with fluid and said plurality of ballast tanks being further structured and disposed to be individually drained of fluid, wherein filling and draining fluid in individual ones of said plurality of ballast tanks allows for controlling the level of submersion and stabilizing the positioning of said at least one primary containment tank within said body of water.

12. The floating fish production system as recited in claim 9 further comprising:

a water pumping system for delivering the water from the exterior body of water and into said tank interior.

13. The floating fish production system as recited in claim 12 further comprising:

a waste recovery system including a waste separator system structured and disposed for separating the waste from water; and said waste recovery system connected to said main drain for receiving the waste from said tank interior.

14. The floating fish production system as recited in claim 12 further comprising:

at least one surface drain extending through at least one of said plurality of individual solid wall sections for draining the water from said tank interior.

15. The floating fish production system as recited in claim 9 wherein said plurality of elongate flexible membranes are constructed from a water resistant elastomer material.

16. The floating fish production system as recited in claim 15 wherein said water resistant elastomer material is neoprene.

* * * * *